United States Patent [19]

Matsumoto et al.

[11] 3,912,932

[45] Oct. 14, 1975

[54] DEVICE FOR LOADING FILMS INTO A RADIOGRAPHIC FILM CASSETTE

[75] Inventors: Takaaki Matsumoto; Takeshi Nakamura; Kaoru Tamura, all of Minami-ashigara, Japan

[73] Assignee: Fuji Photo Film Co., Ltd., Minami-ashigara, Japan

[22] Filed: Jan. 31, 1974

[21] Appl. No.: 438,516

[30] Foreign Application Priority Data
Jan. 31, 1973 Japan.................................. 48-12589

[52] U.S. Cl.................................. 250/468; 250/475
[51] Int. Cl.².......................................... G03B 41/16
[58] Field of Search..................... 250/468, 475, 481

[56] References Cited
UNITED STATES PATENTS

| | | | |
|---|---|---|---|
| 3,075,080 | 1/1963 | Sano................................... | 250/468 |
| 3,828,196 | 8/1974 | Mika................................... | 250/468 |

*Primary Examiner*—Craig E. Church
*Attorney, Agent, or Firm*—Sughrue, Rothwell, Mion, Zinn, & Macpeak

[57] ABSTRACT

A device for loading film into a radiographic film cassette comprising
  a film retaining portion for retaining a stack of radiographic films,
  a cassette insertion port provided under said film retaining portion, said film retaining portion gripping the upper end of a generally upright envelope holding said stack of radiographic film and a cutter carried by said film retaining portion for severing the lower end of said envelope with the gripped envelope being movable upwardly to expose the lower ends of said stacked films,
  a light shielding cover movable between an open position and a closed position and urged in the direction to close said cassette insertion port,
  a film removal means for removing a film from said film retaining portion in accordance with a signal which indicates that the cassette is inserted,
  a light shielding member for shielding light from the film removed from the film retaining portion,
  a shutter mechanism provided on said light shielding member for causing the film fall into the cassette by opening, and
  means for closing the cover of the cassette into which the film has been loaded.

7 Claims, 2 Drawing Figures

DEVICE FOR LOADING FILMS INTO A RADIOGRAPHIC FILM CASSETTE

BACKGROUND OF THE INVENTION

1. Field of the Invention

This invention relates to a device for loading radiographic films into a radiographic film cassette.

2. Description of the Prior Art

Heretofore, radiographic films have generally been loaded into a film cassette manually by the operator of the radiographic apparatus. The operator removes the films individually from an envelope and inserts them into the cassette. With such a manual approach which is performed in a dark room, not only is the work inefficient, but also the film surface tends to be subjected to pressure and the emulsion layer tends to be presensitized. In addition the surface of the film tends to be scratched. Further, the work room space cannot be effectively used because the work room must contain a dark room.

In view of the above defects inherent in radiographic processing work using a conventional radiographic apparatus, a primary object of the present invention is to provide a device for automatically loading radiographic film into a film cassette in the presence of illumination.

Another object of the present invention is to provide a device for loading radiographic films into a radiographic film cassette by simply inserting the cassette into a cassette insertion portion thereof.

Still another object of the present invention is to provide a device for loading radiographic films into a film cassette in which the cassette loaded with the films can be fed out with the cover thereof closed.

A further object of the present invention is to provide a device for loading radiographic films into a film cassette in which there is no concern of damaging the surface of the film.

A still further object of the present invention is to provide a device for loading radiographic films into a film cassette in which the films are loaded into the cassette in a very short time.

SUMMARY OF THE INVENTION

The invention comprises a device for loading a radiographic film cassette including means for retaining a stack of radiographic films, a cassette insertion port, a movable light shielding cover shielding insertion port, means for removing a film from the stack of films, means for light shielding the film removed from the stack including a shutter mechanism for causing the removed film to drop in the cassette and means for closing the cassette cover after loading.

BRIEF DESCRIPTION OF THE ACCOMPANYING DRAWINGS

The above and other objects will be made apparent from the following detailed description of the preferred embodiment thereof taken in conjunction with the accompanying drawings.

DESCRIPTION OF PREFERRED EMBODIMENTS

Figure 1:
FIG. 1 is a longitudinal sectional view of the envelope enclosing radiographic films used in the film loading device in accordance with the present invention.

Referring to FIG. 1, the radiographic films 1 are stacked and enclosed in an envelope 2 and shielded from light.

Figure 2:
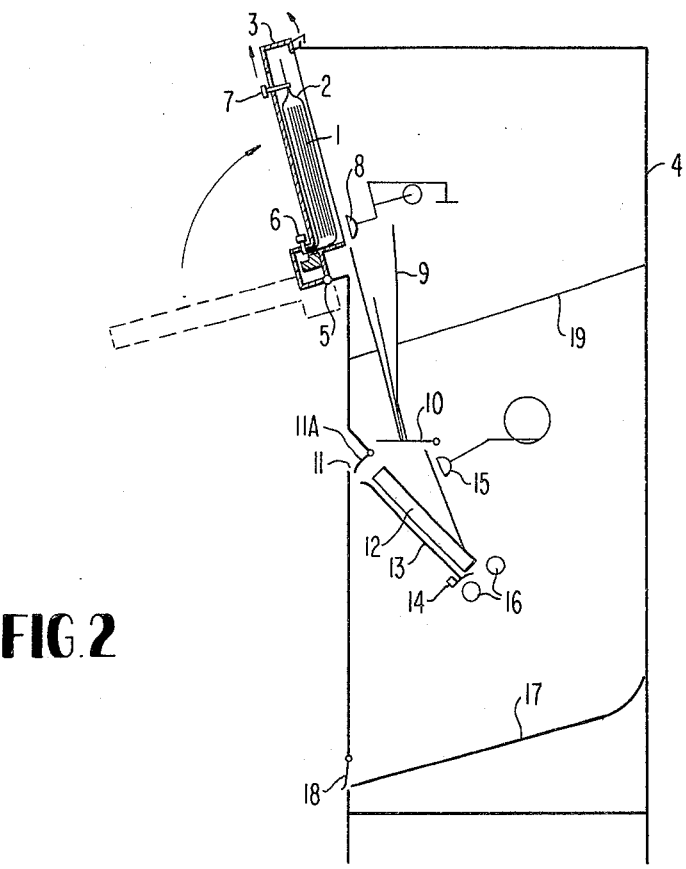
FIG. 2 is a sectional elevation schematically showing the internal construction of the film loading device in accordance with an embodiment of the present invention.

As shown in FIG. 2, reference numeral 3 shows a film loading portion hinged to a housing 4. The film loading portion 3 is movable between the position indicated by a broken line in FIG. 2 and the position indicated with a solid line about a pivot 5. In the position indicated by the broken line, the end of the envelope 2 is fixed to the portion 3. In the position indicated by the solid line, the radiographic films 1 are shielded from light.

The film loading portion 3 is provided with a cutter 6 for cutting the lower end portion of the envelope 2 and an envelope pulling member 7 for pulling the envelope 2 upward to expose the lower portion of the films 1. The cutter 6 and the envelope pulling member 7 are provided with a knob and means extending through the outer wall of the film loading portion 3 so that the cutter 6 and the pulling member 7 may be operated from the outside.

The reference numeral 8 indicates a suction member for removing a sheet of film 1 from the envelope 2 by suction. The suction member 8 is operated by a link mechanism and a vacuum mechanism (not shown) to attract the lower portion of the uppermost film 1 and remove the film and feed it into a hopper 9. The mechanism for removing the films individually may be of any type of conventional mechanism. The film take out mechanism using a suction member as described above is disadvantageous in that the film need not be specially processed and accordingly commercially available film can be used in this mechanism.

The reference numeral 10 indicates a shutter which holds a film fed out of the film loading portion 3 and prevents light from impinging on the film. The reference numeral 11 indicates a cassette insertion port through which the radiographic film cassette 12 is inserted. A light shielding hinge cover 11A is hinged to the housing 4 at the cassette insertion port 11. The light shielding cover 11A is swingable only inward and urged in the direction to close the insertion port 11 by means of a spring (not shown). The reference numeral 13 indicates a guide plate for the cassette 12 and the cassette 12 is guided thereby to a predetermined holding position. A microswitch 14 is provided on the guide plate 13 to detect the insertion of the cassette 12 upon contacting the front end of the cassette 12.

The microswitch 14 is electrically connected with driving means for operating the shutter 10, a suction member 15 for opening the cover of the cassette 12 and the suction member 8 for removing the film 1 so that the suction member 15 may be operated synchronously with the shutter 10 and the shutter 10 may be opened to load the film 1 into the cassette 12 when the cover of the cassette 12 is opened. If the cassette 12 is inserted into the cassette holding position with the cover opened, the suction member 15 is not necessary.

After the film is released and put into the cassette 12, the shutter 10 is closed again and the suction member 8 is operated to take out the next film and the film is again sent to the standby position held by the shutter 10. The reference numeral 16 indicates a pair of rollers for closing the cover of the cassette 12 by pressing the cover when the cassette 12 is fed therethrough.

In the above-described embodiment, the cassette has a cover which is closed by pressure. However, it will be understood that another type of cassette having a cover which is closed mechanically can be used. In such a case, a mechanism for closing the cover is specifically needed.

The reference numeral 17 indicates a guide plate which guides the cassette 11 loaded with the film toward the cassette feed out put 18. The reference numeral 19 indicates a light shielding partition for shielding light from the film when the cassette 12 is inserted into the housing 4.

The operation of the film loading device in accordance with the present invention as described hereinabove is as follows. When a cassette 12 containing no film is inserted into the housing 4 through the cassette insertion port 11 with the cover open, the light shielding cover 11A is opened thereby and the cassette 12 is loaded into the housing by sliding on the guide plate 13. If the light comes into the housing 4 through the cassette insertion port 11 while the cover 11A is opened, the film held in the hopper 9 is shielded from light by the shutter 10 and accordingly the film is not exposed. After the cassette 12 is inserted into the housing 4, the light shielding cover 11A is closed to keep the interior of the housing dark.

The cassette 12 inserted into the housing 4 on the guide plate 13 operates the microswitch 14 when the cassette 12 reaches the predetermined position, and the cassette 12 is stopped by a stopping means. The stopping means may be a stopping means which is projected into the cassette stopping position response to actuation of the microswitch 14 and stays there for a predetermined time. Alternatively, the rollers 16 may be used to stop the cassette 12 by closing the separation between each other when the cassette 12 is inserted into the housing 4. By moving the rollers 16 apart from each other, the cassette 12 can be fed downward. The microswitch 14 operates the suction member 15 to open the cover of the cassette 12. The microswitch 14 is additionally connected with the shutter 10 so that the shutter 10 may be opened when the cover of the cassette is fully opened. When the shutter 10 is opened, the film held in the hopper 9 falls into the cassette 12.

The microswitch 14 is further connected with the suction member 8 for removing the film so that the next film may be removed from the envelope 2 and sent to the hopper 9 after the shutter 10 is closed.

By holding the film in the hopper 9, the time from the insertion of the cassette to the feed out of the cassette loaded with the film can be shortened to a great extent.

The cassette 12 loaded with the film is sent downward after the loading of the film thereinto by the release of the stopping means and the cover of the cassette 12 is closed when the cassette 12 is fed through the rollers 16 and sent to the cassette feed out port 18 being guided along the guide plate 17.

While the invention has been described in detail and with reference to specific embodiments thereof, it will be apparent to one skilled in the art that various changes and modifications can be made therein without departing from the spirit and scope thereof.

What is claimed is:

1. A device for light shield loading of a stack of radiographic film sheets from a sealed envelope into a radiographic film cassette; said device comprising;
   a light proof housing including an upper film retaining housing portion for retaining said envelope in a generally upright position, said film retaining housing portion including means for gripping the upper end of said envelope and cutting means for severing the lower end of said envelope, said gripping means being raisable to raise said severed envelope to expose the lower ends of said stacked films,
   a cassette insertion port provided within said housing beneath said film retaining portion,
   a light shielding cover movable between an open position and a closed position, carried by said housing, and urged in a direction to close off said cassette insertion port,
   a film removal means carried by said housing for removing a film from said film retaining portion in accordance with a signal which indicates that the cassette is inserted,
   a light shielding member for shielding light from the film removed from the film retaining portion,
   a shutter mechanism provided on said light shielding member for causing the film to fall into the cassette by opening movement thereof, and
   means for closing the cover of the cassette into which the film has been loaded.

2. The device for loading film into a radiographic film cassette as defined in claim 1, wherein said film removal means is a suction member operated by a vacuum means to attract the uppermost film of said stack of films.

3. The device for loading film into a radiographic film cassette as defined in claim 2, including a hopper to receive the film removed by said suction member, said shutter being provided under said hopper whereby the film falls when the shutter is opened.

4. The film loading device as defined in claim 1 wherein said cassette cover closing means comprises a pair of rollers provided under the position where the cassette is held during the loading of films therein, said rollers closing the cover of the cassette when the cassette is passed therethrough.

5. The film loading device as defined in claim 1, including a microswitch to detect the insertion of the cassette and electrically connected with the film removal means to operate the film removal means upon detection of the insertion of the cassette.

6. The film loading device as defined in claim 5, wherein said microswitch is further electrically connected with said shutter mechanism so that the shutter may be opened only after the cassette is inserted.

7. The film loading device as defined in claim 6, wherein said film removal means is operable only when the shutter is closed.

* * * * *